P. Young.

Circular Saw Mill.

No. 330. Reissued Oct. 2, 1855.

AM. PHOTO-LITHO. CO. N.Y. (OSBORNE'S PROCESS)

UNITED STATES PATENT OFFICE.

PINNEY YOUNGS, OF MILWAUKEE, WISCONSIN.

MACHINE FOR SAWING LUMBER.

Specification forming part of Letters Patent No. 12,337, dated January 30, 1855; Reissue No. 330, dated October 2, 1855.

*To all whom it may concern:*

Be it known that I, PINNEY YOUNGS, of Milwaukee, in the State of Wisconsin, have invented certain new and useful Improvements in Machinery for Sawing Lumber, of which the following is a full, clear, and exact description, reference being had to the accompanying drawings, making part of this specification, of which—

Figure 6:
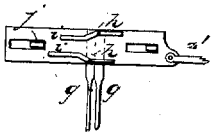
Figure 4:
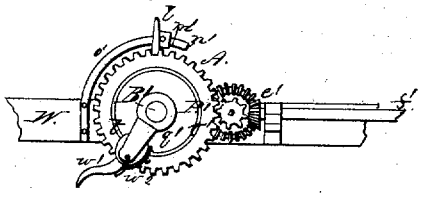
Figure 5:
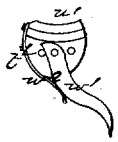
Figure 1:
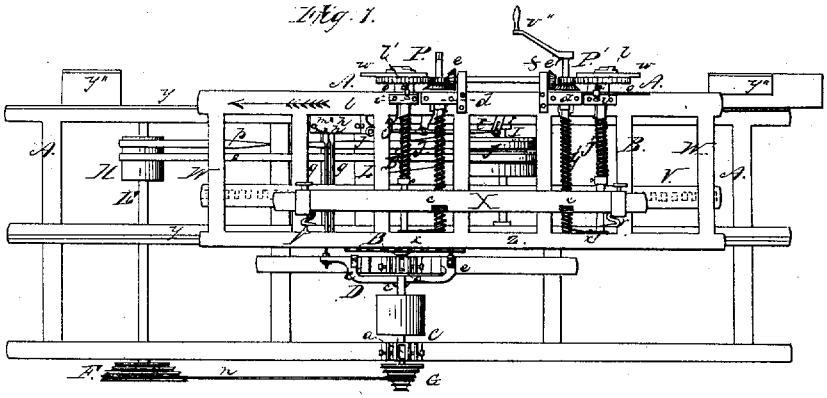
Figure 2:
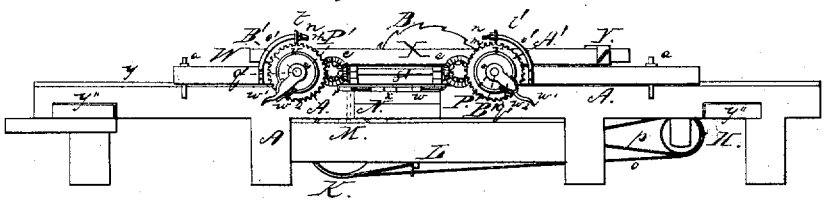
Figure 3:
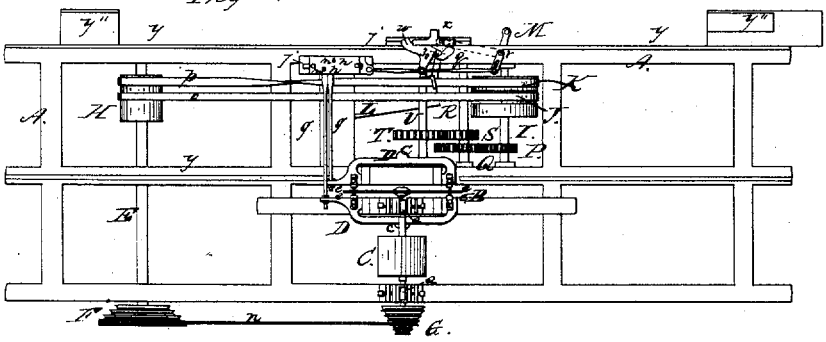

Figure 1 is a plan of the machine; Fig. 2, an elevation; Fig. 3, a plan or top view, with the carriage for carrying the timber removed; Fig. 4, a separate view of the arrangement of machinery employed for setting the log; Fig. 5, a separate view of the clutches employed in the apparatus for setting the log to the saw, and Fig. 6, a detached view of the sliding plate by which the saw-guides are operated.

The same letters indicate like parts in all the figures.

In my said improved machinery for sawing lumber I employ the well-known circular saw, but prior to my invention it was found necessary to use a pair of guides, one on each face of the saw, and near the periphery, to guide the cutting-edge, and thereby prevent it from wabbling and running out of "true"—that is, out of the intended line of cut—the carriage to present and feed the log or timber to the cutting-action moving against the motion of the edge of the saw, and then running back preparatory to resetting the logs for another cut, so that the whole of the time required for running back the carriage was actually lost.

By my invention I am enabled to cut or saw as the carriage moves in either direction; and to this end the nature of my invention consists in combining, with a circular saw and with a carriage which presents or feeds the log or timber to the cutting-action of the saw alternately in opposite directions, the employment of two pair of guides, one pair on each side of the axis of the saw and near the cutting-edge thereof, and so adapted that when one pair is forced against the faces of the saw to guide, the other pair is relieved or withdrawn from the surfaces of the saw, so that when the feeding-motion of the carriage is reversed the guides are shifted, that the cutting-edge of the saw may be guided in close proximity to where the teeth act on the wood, whether the carriage with the log or timber be moving forward or back, while the edge of the saw on the opposite side of the axis is relieved for the time being. In this way the saw is enabled to cut effectually and accurately during the motion of the carriage in either direction, thereby saving the time heretofore required for running back the carriage with the log or timber; and my invention also consists in setting the log for the required thickness of timber to be sawed at the end of each forward and each back motion of the carriage by means of two screw-shafts that receive motion from two wheels operated each by a gripping-pawl when it strikes a stop at the end of the motion, when this is combined with arms projecting from shafts and acting against adjustable stops that determine the extent of set to be given; and my said invention also consists in throwing out of gear the setting apparatus by the action of the bar which carries the log against levers, which in turn disengage the setting apparatus.

In the accompanying drawings, A represents a suitable frame with longitudinal ways *y y* on the upper surface, adapted in any well-known manner to the reception of a carriage, W, which slides longitudinally thereon to present and feed the log or timber when moving in either direction to the cutting-action of the circular saw B on the shaft C, the journals of which are fitted to boxes *a a* on the frame. The journals are of greater length than the boxes, that the shaft may play therein endwise to yield to the buckling of the saw in cutting when the cutting-edge is guided in manner to be presently described. The saw may be of any suitable construction and driven by any suitable motor in the usual manner, and motion is communicated to the other parts of the mechanism from the saw-shaft by a band or strap, *n*, passing around a pair of cone-pulleys, one, G, on the saw-shaft and the other, F, on a parallel shaft, E, so that by shifting the band or strap *n* on the cones the velocity of the feed-motion of the carriage may be varied relatively to the velocity of the saw to suit different kinds and thicknesses of wood and the power of the motor. Motion is communicated to the carriage by two belts, *p o*, one of which is crossed from a pulley, H, on the shaft E to three pulleys, J and K K, on a parallel shaft, I, the pulleys K K being loose on the said shaft and placed one on each side of the pulley J, which is fast, so that when the belt *o* is on the fast pulley J and the cross-belt *p* on one of the loose pulleys, the carriage will be moved in one direction, but when the belts are shipped by the shipper L to transfer the belt *o* to the other loose pulley K and the cross-belt *p* to the fast pulley J, the motion of the carriage will be reversed and return at the same velocity, and motion is imparted from the shaft I to the carriage *w* by a train of pinions and cog-wheels, P Q S T, respectively, on the shafts I R U, the cogs of the last wheel, T, engaging the cogs of a rack, V, on the under side of the carriage represented by dotted lines in Fig. 1. The log or timber to be sawed, and represented by red lines Z in Fig. 1, is held against the front face of a bar, X, by means of dogs driven into the ends thereof, or in any other appropriate manner. The bar X rests on and slides across the upper surface of the carriage, and is moved toward and from the saw to set the log or timber by means of two parallel screws, *y′ y′*, which pass through nuts *c′ c′* set in the bar X, the shafts of the said screws being provided with suitable journals mounted in boxes *d′ d′* in the carriage, and the screw-shafts are geared together to turn with equal velocity to move both ends of the carriage in unison by means of a bevel-pinion on each which engage bevel pinions *e′ e′* on the ends of the shaft *f′*. In this way it will be seen that when either of the screw-shafts is turned to move one end of the bar X with the log or timber toward or from the saw a like motion in the reverse direction will be imparted to the other screw shaft, and hence to the other end of the bar X the thread on the two screw-shafts being reversed. For the purpose of drawing the bar X back from the saw to receive a log a crank-handle, *v″*, can be applied to the outer end of either of the screw-shafts to operate them by hand; but the operation of moving of the bar with the log toward the face of the saw for the purpose of setting the log for each successive cut is performed automatically by the following mechanism: Outside of each screw-shaft there is a parallel shaft, B′, mounted in suitable boxes, *i′*, in the carriage W, in which they can turn and slide endwise, a helical spring, *j′*, being coiled around each shaft and interposed between and attached to a portion of the carriage, and a shoulder, *k′*, on the shaft for the purpose of keeping the shafts in the position represented in the drawings, and yet permit them to be forced back or turned, when required, for purposes to be presently described. Each one of these shafts carries on its outer end a cog-wheel, A′, turning loosely thereon, and which engages a pinion on the outer end of the screw-shaft next to it, so that when either of the wheels A′ is turned to the desired extent the required motion will be imparted to the two screw-shafts. Outside of each wheel A′, and secured to the shaft thereof, is a hub, P′, having a radial arm, *q′*, to which is fitted a gripping-block, *t*, which slides thereon radially. The inner face of this gripping-block has a fillet, *u′*, to fit over a concentric fillet or flange, *v′*, projecting from the face of the wheel A′; and to the inner face of this block is jointed a gripping lever or pawl, *w′*, the inner end of which is outside of the fillet or flange *v′*, so that when the outer end of this lever is moved in one direction the inner end or face will press against the outer periphery of the concentric fillet or flange *v*, drawing out the gripping-block, and thus gripping the said flange between the inner face of gripping lever or pawl *w′* and the fillet *u′* on the gripping-block, so that by continuing to move the said lever the wheel will be turned, and thereby turn the screw-shafts to set the log. The gripping-block is provided with a spring, $w^2$, which acts on the gripping-pawl lever *w′* to keep it relieved from the flange *v′*, except when acted upon to turn the wheel. There are two stops, *y″ y″*, one near each end of the frame and at a distance apart depending upon the extent of motion desired to be given to the carriage and depending upon the length of timber. On each shaft B′ there is an arm, *l′*, between the frame and the wheel A′, the outer end of which, as the tension of the helical spring *j* tends to turn the shaft, strikes against a stop pin, *m′*, to prevent the shaft from being rotated beyond the determined distance. This pin *m′* projects from an adjustable block, *n′*, which slides on a sector, *o′*, attached to the carriage, so that by setting the blocks *n′ n′* with their stop-pins *m′ m′* at a greater or less elevation on the sectors *o′ o′* will determine the elevation to which the arms *q′ q′* with their gripping apparatus will be carried by the tension of the springs *j′ j′*, on the two shafts B′ B′. The arms with their gripping-pawls *w′ w′* being thus held up by the tension of the springs at any elevation determined by the position of the adjustable block *n′ n′*, as the carriage W approaches the end of its motion in either direction, one of the gripping-pawl levers *w′* comes in contact with one of two stops, *y″ y″*, near the ends of the frame, and as the carriage continues to move the pawl is thereby put in motion, and first grips the flange *v′* on, and turns the wheel A′, which puts in motion the whole apparatus to set the log to a distance depending upon the set of the adjustable block *n′*. The carriage is then reversed, as will be presently described. As it moves back the gripping-pawl is carried back to its original position by the tension of the helical spring *j′* on the shaft B′. This setting operation of course takes place after the log leaves the saw; but it will be obvious from the foregoing that it is necessary at the required time to reverse the motion of the carriage, which is effected in the following manner, viz: The carriage is provided with two pins, *a″ a″*, one near each end, the position of which, like the stops *y″ y″* must correspond with the intended length of motion of the carriage, and which, if desired, may be adjustable at the discretion of the constructor. When the carriage approaches the end of its motion in either direction one of the pins, $a$,'' strikes against the projecting part of a slide, $x$, which is mounted in the frame, and moves it horizontally and vibrates a lever, $o^3$, which turns on a fulcrum-pin, $v$, and which is biurcated at $w$ $w$ to embrace the slide $x$. This lever $o^3$ is connected by a rod, $t$, with an arm, $r$, on the upper end of a spindle, N, (represented by dotted lines in Fig. 2,) of a lever, M, one arm of which (represented by dotted lines in Fig. 3) is in turn connected by a link, $q$, with the belt-shipper L, by which one of the belts $o$ $p$ is shifted from the fast pulley J to one of the loose pulleys K, and the other from one of the loose pulleys K to the fast pulley J, by which the motion of the carriage is reversed. This permits the gripping-pawls $w$ $w$ to be carried back to their original position by the tension of the springs $j'$ $j'$ on the shafts B′ B′ preparatory to setting the log again at the end of the reversed motion of the carriage. In this way the log is set at the end of each motion of the carriage, the setting apparatus at each end of the carriage alternating. By means of the projecting end of the lever M the operator can at any time reverse the motion of the carriage by hand. The inner ends of the shafts B′ B′ are forced against two levers, $x'$ $x'$, hung to that rail of the carriage W nearest to the saw, so that when the bar X, with its dogs Y Y, approaches too near to the plane of the saw, it (the bar) acts on the said levers to force back the shafts B′ B′ to disengage the wheels A′ A′ from the pins on the screw-shafts, and thus disengage the feed-motion, which is re-engaged by the tension of the springs $j'$ $j'$ so soon as the bar is drawn back. There are two pair of saw-guides, $e$ $e$ $e$ $e$, of the usual construction, but attached to the ends of two levers, D D, hung on fulcrum-pins $c$ $c$ in the vertical plane passing through the axis of the saw-shaft; and the levers and the guides on them are so located that when the levers are vibrated in one direction one pair of guides will bear against the two faces of the saw just within the teeth on one side of the axis of the saw and near to the surface of the log to be sawed, and when vibrated in the opposite direction this pair of guides will leave the surfaces of the saw, and the other pair of guides will pinch the saw in like manner on the other side of the axis. These guides are shifted at the end of each motion of the carriage, that the edge of the saw may be guided on that side of the axis toward which the carriage is moving, and as near to the point of cutting-action as practicable, and thus insure the cutting in a straight line, while the play of the shaft in its bearings may yield to the buckling of the saw.

To shift the guides at the required time the levers at one end have rods $g$ $g$, attached to them by adjusting-nuts, and the rods at their opposite end carry pins $h$ $h$, which slide in guide-slots $m$ $m$ in a permanent plate, $l$, attached to the frame; and these pins are also fitted to slots $i$ $i$ in a plate, $j$, that slides longitudinally in suitable ways in the frame. These slots are for a short distance at each end in the direction of the line of motion, but at one end farther apart than at the other, and between the two straight parts they are diagonal. As the plate $j$ slides back and forth the slot acts on the pins $h$ $h$ of the two rods $g$ $g$, and vibrate the levers D D in opposite directions, thus causing one pair of guides to liberate and the other to pinch the saw, and vice versa. Now, this sliding plate $j$ is connected by a joint-link, $z'$, with the lever $o^3$, which operates the belt-shipper to reverse the motion of the carriage so that the saw-guides are shifted by the same operation which reverses the motion of the carriage.

Having thus described the principle or mode of operation of my said invention, as also the mode of construction which I have tried with success, I do not wish to be understood as limiting my claim to the mode of construction herein specified, as the same mode of operation may be applied by the substitution of equivalent means.

What I claim as my invention, and desire to secure by Letters Patent, is—

1. The employment of two pairs of shifting guides, substantially as herein described, in combination with a circular saw alternately in opposite directions, substantially as and for the purpose specified.

2. Setting the log or timber by means of the two screw-shafts geared in the manner described, or the equivalent thereof, and operated by gripping-pawls which act against stops at the end of the motions of the carriage, in combination with the arms and adjusting-slides to determine the degree or extent of set intended to be given to the log, substantially as specified.

3. In combination with the method of setting the log at the end of the several motions of the carriage, substantially as described, the method of throwing the setting apparatus out of gear by the bar which carries the log, substantially as described, to prevent the said bar with the holding-dogs from approaching too near to the saw, as set forth.

PINNEY YOUNGS.

Witnesses:
J. N. MASON,
FRANCIS BUASEN.